(12) United States Patent
Kark

(10) Patent No.: US 7,827,913 B2
(45) Date of Patent: Nov. 9, 2010

(54) DEVICE WITH SEVERAL ROLLERS

(75) Inventor: Uwe Kark, Hamburg (DE)

(73) Assignee: Kark AG, Hamburg (DE)

( * ) Notice: Subject to any disclaimer, the term of this patent is extended or adjusted under 35 U.S.C. 154(b) by 704 days.

(21) Appl. No.: 11/663,864

(22) PCT Filed: Sep. 30, 2005

(86) PCT No.: PCT/EP2005/010607

§ 371 (c)(1),
(2), (4) Date: Mar. 27, 2007

(87) PCT Pub. No.: WO2006/034878

PCT Pub. Date: Apr. 6, 2006

(65) Prior Publication Data

US 2008/0168914 A1   Jul. 17, 2008

(30) Foreign Application Priority Data

Sep. 30, 2004  (DE) .................. 20 2004 015 229 U

(51) Int. Cl.
*B41F 13/20*   (2006.01)
(52) U.S. Cl. ........................ 101/479; 101/36
(58) Field of Classification Search ................ 101/216, 101/479
See application file for complete search history.

(56) References Cited

U.S. PATENT DOCUMENTS

| | | | | |
|---|---|---|---|---|
| 2,925,037 A | * | 2/1960 | Fischer | 101/216 |
| 5,678,485 A | * | 10/1997 | Guaraldi | 101/247 |
| 5,960,714 A | * | 10/1999 | Gottling et al. | 101/216 |
| 6,543,356 B2 | * | 4/2003 | Gottling et al. | 101/248 |
| 6,823,165 B1 | * | 11/2004 | Nagy et al. | 399/302 |
| 2002/0078840 A1 | * | 6/2002 | Gaffney et al. | 101/217 |

FOREIGN PATENT DOCUMENTS

| | | |
|---|---|---|
| DE | 35 43 704 A1 | 6/1987 |
| DE | 36 16 699 A1 | 11/1987 |
| DE | 195 00 729 A1 | 7/1996 |
| DE | 197 40 129 A1 | 3/1999 |
| EP | 0 163 104 A2 | 12/1985 |
| EP | 0 693 329 A2 | 1/1996 |
| EP | 0 741 009 A2 | 11/1996 |
| WO | WO 2005/072929 A1 | 8/2005 |
| WO | WO 2006/034878 A1 | 4/2006 |

* cited by examiner

*Primary Examiner*—Anthony H. Nguyen
(74) *Attorney, Agent, or Firm*—Alix, Yale & Ristas, LLP

(57) ABSTRACT

The device with a housing and several rollers, circular-cylindrical drums and the like, the axles of which are parallel and which are mounted between two walls, in particular for forming a strip, which can be formed at elevated temperatures, as it passes through on the surface of a rotating drum, is characterized in that one of the walls can be pivoted open in order to expose the rollers, drums and the like and one of the walls is fastened by way of one or more hinges to a component which can be displaced parallel to the axles, and in that a locking element is provided on the other side, which locking element acts on the wall, fixes or releases the latter and is likewise attached to a component which can be displaced parallel to the axles.

20 Claims, 6 Drawing Sheets

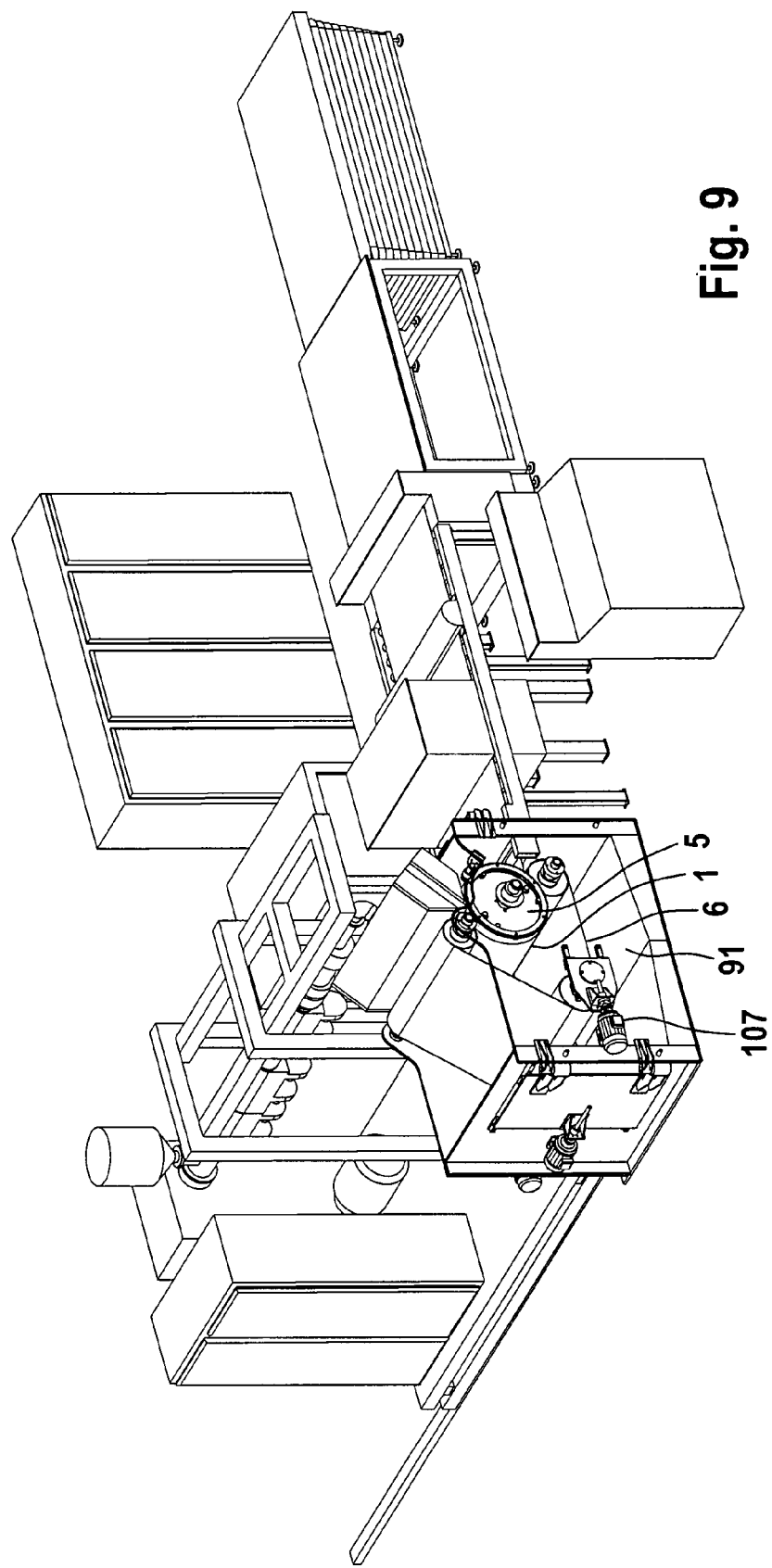

DEVICE WITH SEVERAL ROLLERS

BACKGROUND

The invention relates to a device with a housing and several rollers, circular-cylindrical drums and the like, the axles of which are parallel and which are mounted between two walls, in particular for forming a strip, which can be formed at elevated temperatures, as it passes through on the surface of a rotating drum. The rollers, drums and the like can be mounted here with their corotating axle or shaft between the walls or on a fixed parallel axle which is arranged between the walls and on which they rotate.

In devices of this type, it is frequently necessary to service or exchange the rollers, drums and the like. This is necessary, in particular, in a device for forming a strip, which can be formed at elevated temperatures, as it passes through on the surface of a rotating drum, which is the subject matter of a prior application PCT/EP 2004/004145. There, a mass which can be formed at elevated temperatures is pressed between a drum and a carrier belt by a roller against the drum, in order to provide the mass which is present in strip form with impressed portions which correspond to those of the surface of the drum. The mass is subsequently cooled and guided out of the device with the impressed portions which have been produced in this way. In a device of this type, it is necessary, for example, if other impressed portions are to be manufactured, to replace the drum with a drum with other surface patterns. The belt possibly has to be replaced on account of wear. In some circumstances, the roller which presses the mass against the drum, and further deflection rollers, cooling rollers and the like also have to be exchanged. There are similar problems in other devices, in which likewise the rollers, drums and the like have to be accessible and have to be maintained, in particular if they have to be exchanged relatively frequently.

It is known not to provide both walls, in which the rollers, drums and the like are mounted, as a fixed part of the housing. Rather, one of the walls can be pivoted open. Here, this wall is fastened by way of a hinge which makes the pivoting movement possible (DE 35 43 704 A1). Here, the problem occurs that the bearings describe a circular arc in the wall, while the bearings of the rollers, drums and the like permit only pulling off in the axial direction.

In order to solve this problem, it is known to displace the wall for exchanging rollers and the like on a carriage in the axial direction of the rollers and to fold it over only when the ends of the rollers or the axles are exposed. The wall can therefore first of all be moved away in the axial direction, until the rollers, drums and the like are no longer surrounded by the bearings which are provided in the wall. Subsequently, the wall can be pivoted open. Here, the folding over takes place with the aid of a piston/cylinder unit, with which the wall is to be held perpendicularly with respect to the axial direction of the rollers during the operation of the rollers and during the movement out of and into the wall (EP 0 693 329 A2). However, this is not possible in an exact manner, or only with a very high mechanical and electronic control expenditure as a result of the piston/cylinder unit which acts in the vicinity of the hinge, about which the folding over of the wall takes place.

SUMMARY

A device is provided with a housing and several rollers, circular-cylindrical drums and the like, the axles of which are parallel and which are mounted between two walls, in particular for forming a strip, which can be formed at elevated temperatures, as it passes through on the surface of a rotating drum, it being possible for one of the walls to be pivoted open in order to expose the rollers, drums and the like, and one of the walls being fastened by way of one or more hinges to a component which can be displaced parallel to the axles, in that a locking element is provided on the other side, which locking element acts on the wall, fixes or releases the latter and is likewise attached to a component which can be displaced parallel to the axles.

In order that the wall does not tilt during the linear movement of the components, a locking element is therefore provided on that side of the wall which lies opposite the hinges, which locking element acts on the wall, fixes or releases the latter and is likewise attached to a component which can be displaced parallel to the axles. Both components are driven synchronously, with the result that it is ensured that the wall is moved away from the rollers/drums precisely in the axial direction and is moved toward them again during closing.

The components are expediently mounted in linear guides by way of roller or ball bearings, which results in particularly precise and still easy-running guidance.

The components can expediently be displaced with the aid of motors which are controlled, in particular, by way of electronic means in such a way that the components move at the same speed on both sides of the wall which can be pivoted outward. Here, stepping motors are particularly advantageous, by way of which the synchronous displacement can be achieved in a particularly simple and reliable manner. Tilting is therefore prevented reliably despite the relatively uncomplicated mechanical structure.

In the closed state, the hinges prevent the movement of the wall in their plane per se, as a result of which the rollers/drums would tilt. However, the bearing is even more reliable if the pivotable wall and the housing are provided at the edge of the opening which is to be closed by this wall with complementary guide elements, the guide faces of which are parallel to the axles. In one particularly expedient embodiment, the guide elements are centering pins and corresponding holes. If the centering pins are inserted into the holes after closure of the wall, any movement of the wall transversely with respect to the axles of the rollers/drums is prevented.

It goes without saying that the linear guides have to move the components out only to such an extent that the wall releases the mounted axles of the rollers/drums. Furthermore, it goes without saying that the locking element likewise has to be pivotable, in order to release the pivotable wall when it is sufficiently far away from the rollers/drums as a result of the linearly guided components.

When the pivotable wall is open, the axles, rollers, drums and the like are still mounted only on the rear wall. In order that the pivotable wall can be closed again although the axles, rollers or drums sag a little, the front ends of the corresponding axles and the bearing opening in the pivotable wall are expediently provided with entry bevels.

Particularly heavy drums are expediently clamped axially additionally. Here, the core of the roller which does not corotate is pulled by a tensile stress against a sleeve which is supported on the housing wall.

In one application, a steel strip which has to be tensioned is guided over the drums, rollers and the like. In this case, it is advantageous if a tensioning device is provided on both walls, in which the corresponding axle or shaft is mounted.

BRIEF DESCRIPTION OF THE DRAWINGS

FIG. 9 shows the device with a clamping device for a driven shaft.

DETAILED DESCRIPTION OF THE PREFERRED EMBODIMENTS

The device can be used in different fields. Here, one application which is not the only application, however, is that which is described in the abovementioned PCT/EP 2004/004145. This device is to be seen only as an example; the invention can also be used in other devices with several rollers, drums and the like.

Figure 1:
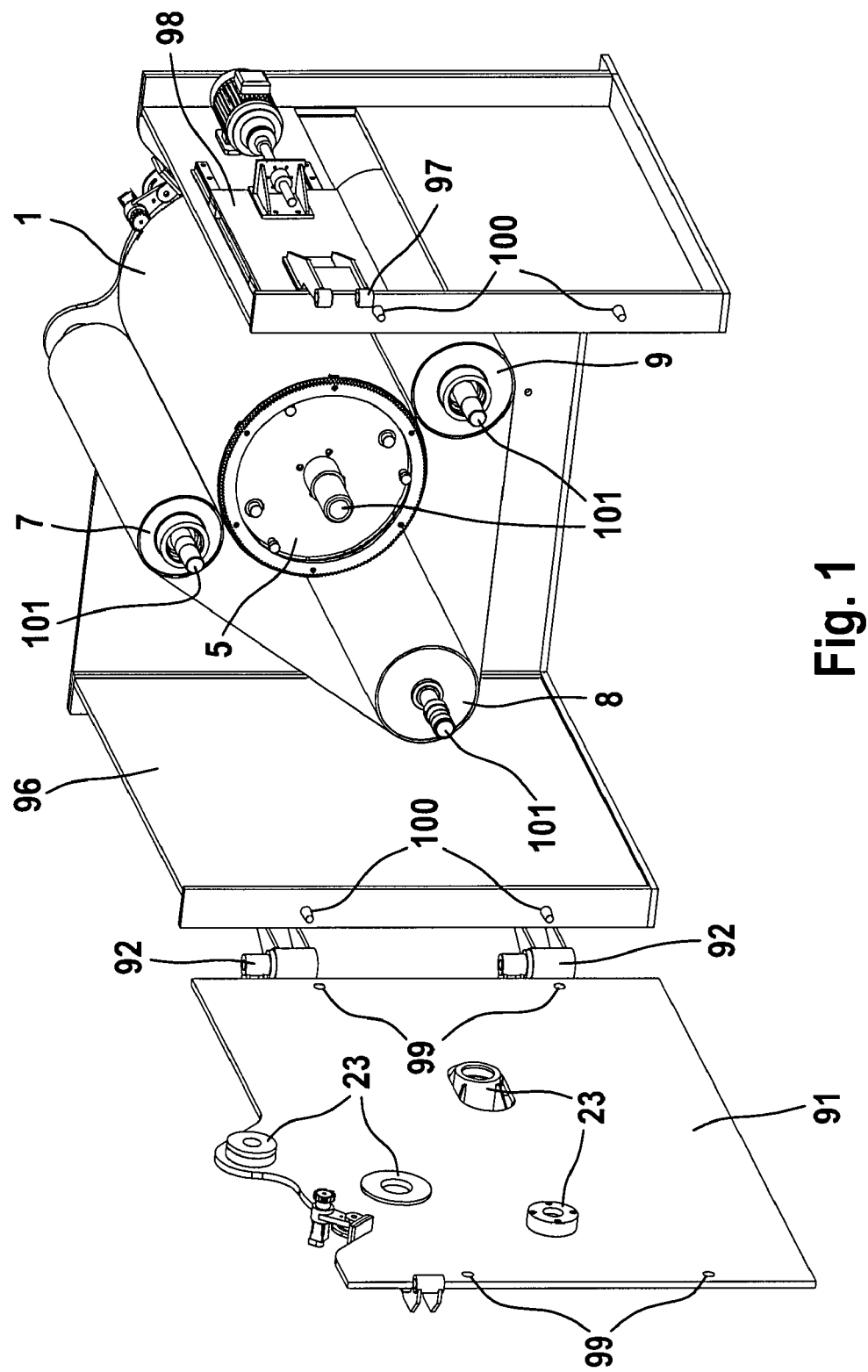
FIG. 1 shows a perspective view of a device.
Figure 2:
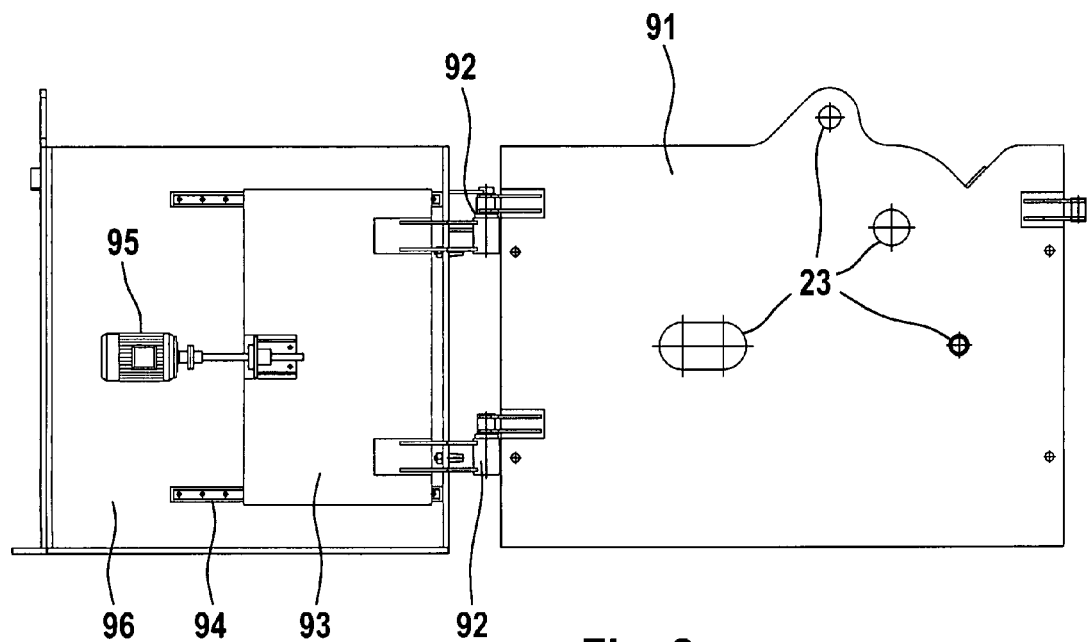
FIG. 2 shows a plan view of the left-hand side of the device from FIG. 1, in the position which is shown there.
Figure 4:
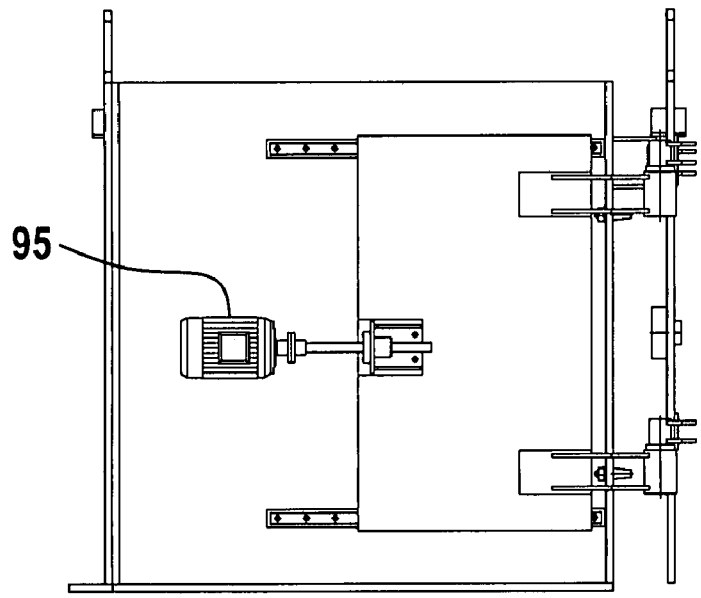
FIGS. 4-5 show illustrations which correspond to FIGS. 2 and 3, after the pivotable wall has been pivoted.
Figure 6:
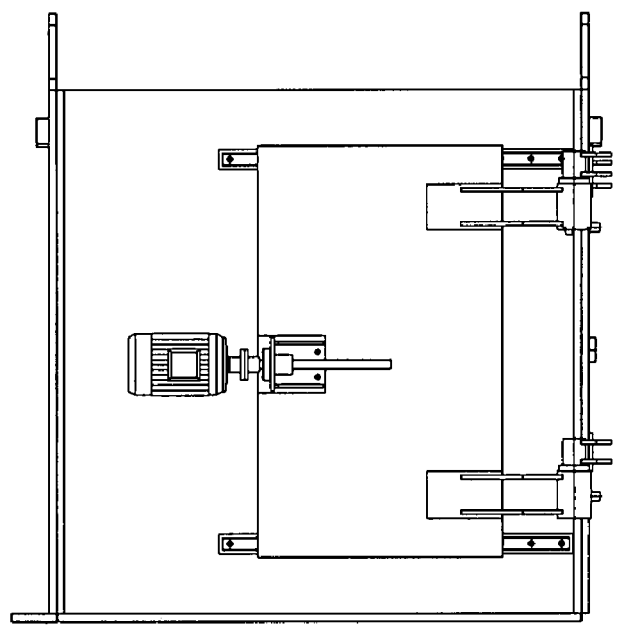
FIGS. 6-7 show illustrations which correspond to FIGS. 2 and 3, after the pivotable wall has been pulled onto the housing.
Figure 7:
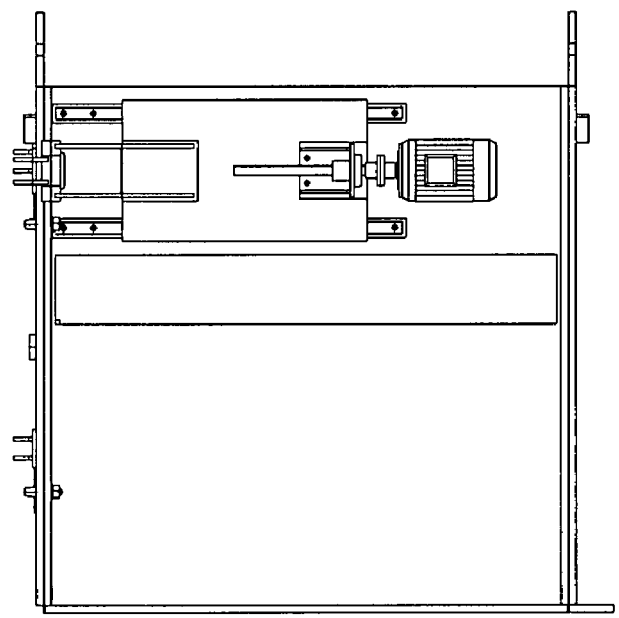

FIG. 1 shows a device. The axles 101 of a drum 1 and of rollers 7, 8 and 9 are mounted at the end which points toward the observer in a pivotable wall 91 in bearings 23 when the pivotable wall 91 is closed. Both the ends of the axles 101 and the bearings 23 are provided with entry bevels which also make it possible to close the wall 91 in the case of (slight) sagging of the front ends of the axles 101. The wall 91 is arranged such that it can pivot with the aid of hinges 92, with the result that it can be pivoted out of the open position which is shown in FIG. 1 in the direction of the axles 101 of the drum 1 and of the rollers 7, 8, 9. Here, the hinges 92 are arranged on a component which is shown in FIGS. 2, 4 and 6. The component 93 can be displaced on rails 94 and can be moved by a motor 95. In the position which is shown in FIG. 2, the hinges 92 are therefore at a spacing from the housing 96.

Figure 3:
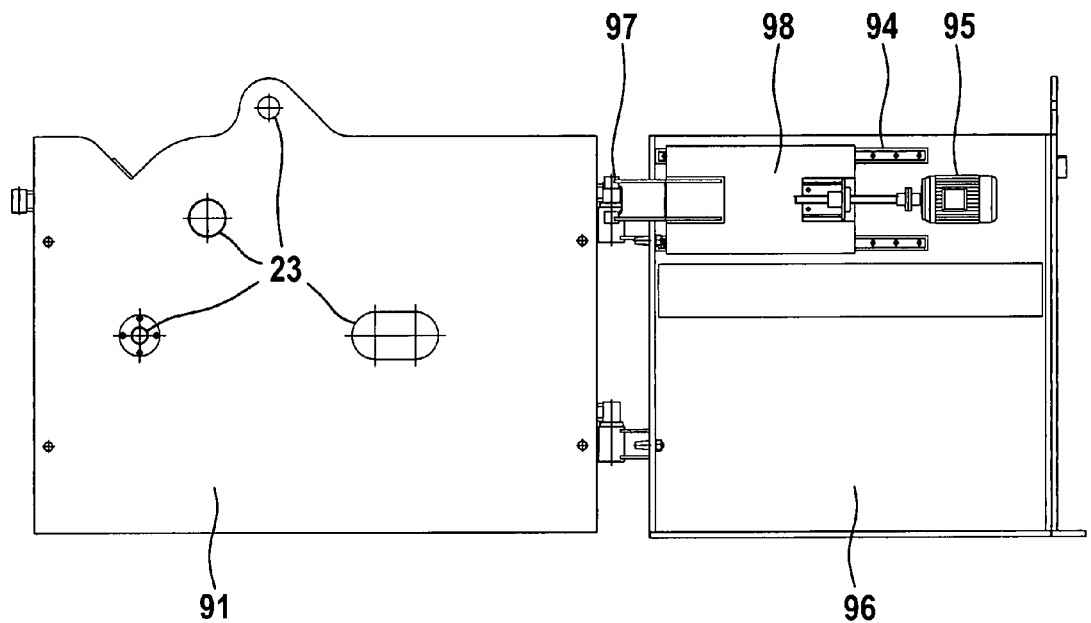
FIG. 3 shows a plan view of the right-hand side of the device from FIG. 1, in the position which is shown in FIG. 1.
Figure 5:
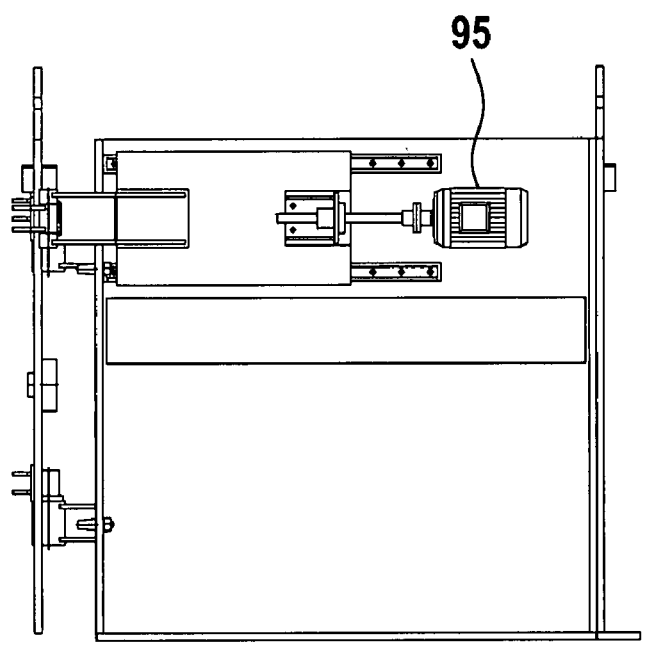

As can be seen from FIGS. 1, 3, 5 and 7, a closure element 97 is arranged on the side which lies opposite the hinges 92, which closure element 97 is likewise arranged on a displaceable component 98 which is likewise mounted in rails 94 and can be displaced with a motor 95. If the wall 91 is pivoted by 90° out of the open position which is shown in FIGS. 1, 2 and 3, it assumes the position which is shown in FIGS. 4 and 5, in which it is situated perpendicularly with respect to the axles of the drum 1 and the rollers 7, 8 and 9, but is not yet closed. Subsequently, the pivotable wall 91 is then pulled against the housing 96 by actuation of the motors 95, the axle ends of the drum 1 and of the rollers 7, 8 and 9 engaging into the corresponding bearings 23. In the closed position, the pivotable wall 91 is also secured by centering pins 100 which are shown in FIG. 1. They engage into corresponding holes 99 of the pivotable wall 91.

Figure 8:
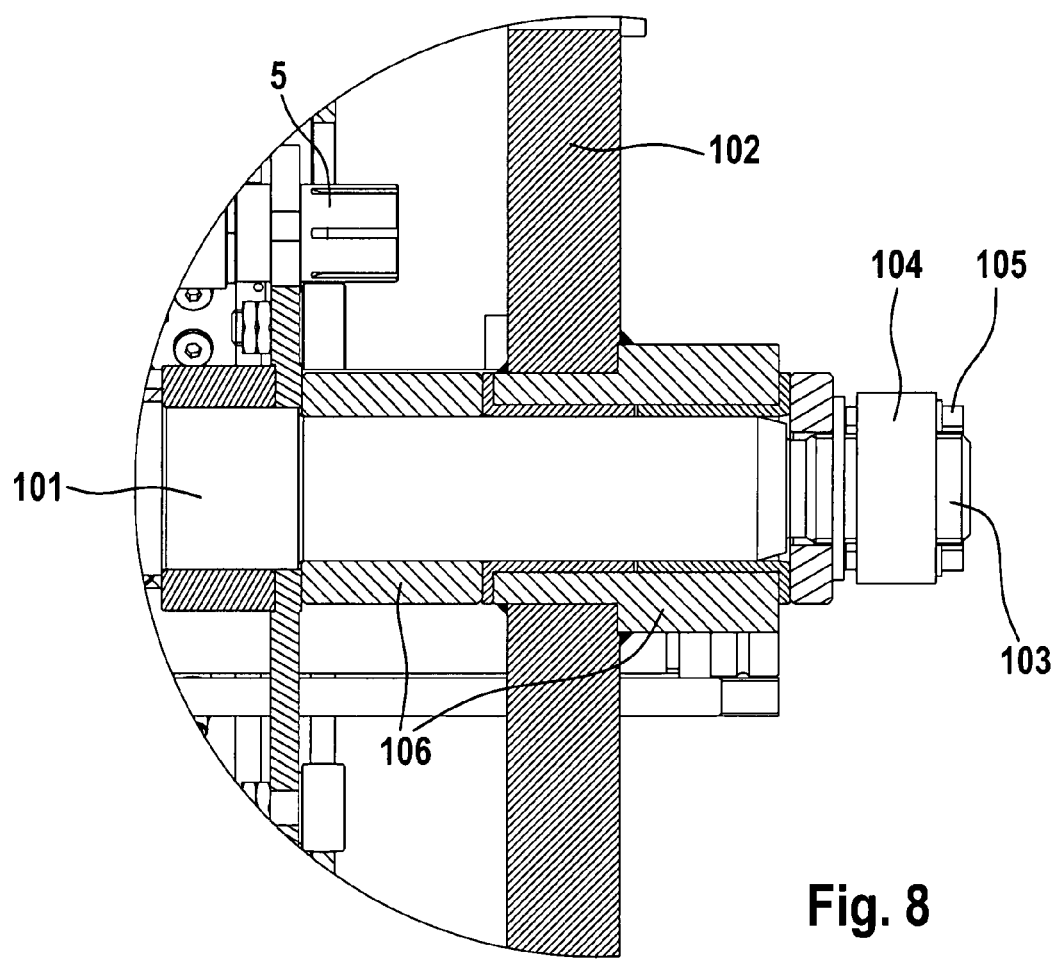
FIG. 8 shows the axial clamping of the substructure of the drum.

FIG. 8 shows the axial clamping of the drum 1 or its carrier body 5, which axial clamping is required if the carrier body 5 and the drum 1 have a considerable weight of, for example, more than one ton and the risk is therefore great that they will sag after the pivotable wall is opened. FIG. 8 shows details of the carrier body 5 of the drum 1 and the axle 101 of the same which is mounted in the wall 102 which cannot be pivoted. Here, the end of the axle 101 has an end section 103 which is provided with a thread and onto which a sleeve or nut 104 which is provided with an internal thread is screwed. Threaded holes are provided in the axial direction in this sleeve or nut 104, into which threaded holes screws 105 are screwed which are supported on sleeves 106 via intermediate elements. If the screws 105 are tightened, the axle 101 is clamped outward in the axial direction, with the result that sagging is avoided or at least reduced to such an extent that closure of the pivotable wall is possible on account of the abovementioned entry bevels.

FIG. 9 shows one embodiment, in which a shaft is provided with a tensioning device 107 at its two ends, in order to tension a circumferential steel strip 6.

The invention claimed is:

1. A device with a housing and several rollers and a circular-cylindrical drum, said rollers and drum having axles which are parallel and which are mounted between two walls, said device having a component and one of the walls being pivotable open in order to expose the rollers and drum, and said one pivotable wall being fastened at one side portion by way of one or more hinges to the component, characterized in that a locking element is provided on a side portion of the one pivotable wall which is disposed opposite the one or more hinges, which locking element acts on the one pivotable wall and fixes or releases the one pivotable wall and is likewise attached to the component and said component is displaced parallel to the axles.

2. The device as claimed in claim 1, characterized in that the component is mounted in a linear guide by way of a roller or ball bearings.

3. The device as claimed in claim 1, characterized in that the device has a motor and the component is displaced with the aid of the motor.

4. The device as claimed in claim 1, characterized in that the one pivotable wall and the housing are provided at an edge of an opening which is to be closed by said one pivotable wall with complementary guide elements having guide faces of which are parallel to the axles.

5. The device as claimed in claim 4, characterized in that the guide elements are centering pins and holes.

6. The device as claimed in claim 1, characterized in that the axles have ends and the one pivotable wall has bearings, and said ends and bearings are provided with entry bevels.

7. The device as claimed in claim 1, characterized in that the device has a mechanism for clamping at least one axle axially.

8. The device as claimed in claim 7, characterized in that the mechanism for clamping the axle axially has a threaded nut with a screw which is arranged axially therein, and a supporting sleeve.

9. The device as claimed in claim 2, characterized in that the device has a motor and the component is displaced with the aid of the motor.

10. The device as claimed in claim 2, characterized in that the one pivotable wall and the housing are provided at an edge of an opening which is to be closed by said one pivotable wall with complementary guide elements having guide faces of which are parallel to the axles.

11. The device as claimed in claim 3, characterized in that the pivotable wall and the housing are provided at an edge of an opening which is to be closed by said one pivotable wall with complementary guide elements having guide faces which are parallel to the axles.

12. The device as claimed in claim 9, characterized in that the pivotable wall and the housing are provided at an edge of an opening which is to be closed by said one pivotable wall with complementary guide elements having guide faces which are parallel to the axles.

13. The device as claimed in claim 2, characterized in that the axles have ends and the one pivotable wall has bearings, and said ends and bearings are provided with entry bevels.

14. The device as claimed in claim 3, characterized in that the axles have ends and the one pivotable wall has bearings, and said ends and bearings are provided with entry bevels.

15. The device as claimed in claim 4, characterized in that the axles have ends and the one pivotable wall has bearings, and said ends and bearings are provided with entry bevels.

16. The device as claimed in claim 5, characterized in that the axles have ends and the one pivotable wall has bearings, and said ends and bearings are provided with entry bevels.

17. The device as claimed in claim 3 wherein the motor is a stepping motor.

18. The device as claimed in claim 2, characterized in that the device has a mechanism for clamping at least one axle axially.

19. The device as claimed in claim 3, characterized in that the device has a mechanism for clamping at least one axle axially.

20. The device as claimed in claim 4, characterized in that the device has a mechanism for clamping at least one axle axially.

* * * * *